United States Patent
Boyd

[15] 3,668,621
[45] June 6, 1972

[54] MULTIPLE ALTITUDE SIGNALING DEVICE

[72] Inventor: Carl L. Boyd, Kingsport, Tenn.
[73] Assignee: Eastman Kodak Company, Rochester, N.Y.
[22] Filed: May 1, 1970
[21] Appl. No.: 33,756

[52] U.S. Cl. .................................................340/27 R, 356/251
[51] Int. Cl. ..........................................................G08g 5/00
[58] Field of Search................343/112.2; 340/27, 240; 73/384; 356/251; 244/77 D

[56] References Cited

UNITED STATES PATENTS

| | | | |
|---|---|---|---|
| 3,521,228 | 7/1970 | Congleton et al. | 340/27 |
| 2,852,974 | 9/1958 | Nobles | 356/251 |
| 3,505,504 | 4/1970 | Walker | 340/27 |

Primary Examiner—Ralph D. Blakeslee
Attorney—Cecil D. Quillen, Jr. and Daniel B. Reece, III

[57] ABSTRACT

An apparatus particularly suitable for use during aircraft landing and departures under conditions of minimum visibility wherein a signal is provided to the pilot of the aircraft when the aircraft has reached any one of a series of preselected altitudes. The apparatus consisting of an altitude sensing device adapted to provide an output pulse as the aircraft reaches each of a series of preselected altitudes, an actuating device capable of receiving the pulse, interpreting the pulse and activating the appropriate portion of the signaling device, and a signaling device capable of warning the pilot of the aircraft altitude while he is looking through the aircraft wind screen.

8 Claims, 2 Drawing Figures

PATENTED JUN 6 1972

3,668,621

CARL LEO BOYD
INVENTOR.

BY Daniel B. Reece II

ATTORNEY

MULTIPLE ALTITUDE SIGNALING DEVICE

This invention is an apparatus particularly suitable for use during aircraft landings and departures under conditions of minimum visibility wherein a signal is provided to the pilot of the aircraft when the aircraft has reached any one of a series of preselected altitudes.

Aircraft approaches to and departures from airfields during periods of low visibility present a problem to aircraft pilots since they involve a combination of both instrument and visual approach techniques. During the early stages of an approach it is feasible for the pilot to devote his full attention to his instruments. However, as he descends it is necessary for him to devote ever-increasing amounts of his attention outside the aircraft in an attempt to establish visual contact with the airfield. This is a critical period for the pilot as: (1) visibility is usually still somewhat obscured; (2) it is often difficult to establish a visual reference from which the altitude, glide slope, etc., of the aircraft can be quickly and accurately judged; and (3) the aircraft is down to a critical altitude requiring rapid decisions relative to continuing or aborting the approach. Thus, even after visual contact is established the pilot must still rely heavily upon his instruments to supplement his visual references.

One of the most critical instruments used during this stage of the landing approach is the altimeter. Reference to the altimeter however requires that the pilot glance down at the instrument panel and then back out through the windscreen at the approaching runway. This glance results in a loss of visual contact with the runway during a time in the approach when ground clearance is at a critical point and full attention of the pilot should be directed to the approaching runway.

It is an object of the present invention to provide a warning device suitable for providing altitude information to the pilot while he is looking through the windscreen. A further object is to provide a definite indication when the aircraft has reached each of a series of preselected altitudes.

To accomplish these objects, an altitude sensing device is installed in the airplane which is capable of providing an output pulse at each of a number of preselected altitudes. In some instances, the altitude sensing device already installed in the aircraft may be modified to provide the desired output pulses. The output pulse is routed to an actuating device which interprets the pulse and in turn activates the appropriate portion of the signaling device to alert the pilot to the fact that the aircraft has reached that specific altitude.

A better understanding of the invention will be gained by reference to the drawings and description which follows.

Figure 1:
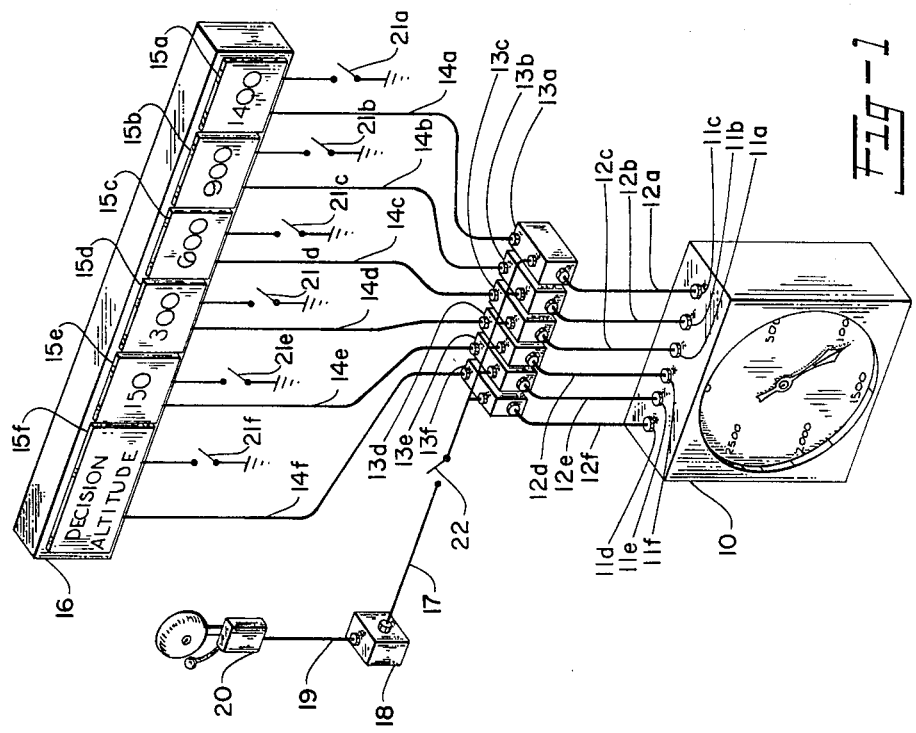
FIG. 1 is a schematic diagram of the invention.

The overall operation of this apparatus may be readily understood by reference to FIG. 1 of the drawing in which one embodiment of the apparatus is illustrated. In particular, the invention consists of an altitude sensing means 10 equipped with a plurality of pulse outlets 11a-f each of which is connected by suitable conductors 12a-f to actuating means 13a-f. The actuating means 13a-f in turn are connected by suitable conductors 14a-f to a plurality of signaling means 15a-f contained in a visual signaling display 16. In addition each of the actuating means 13a-f may be connected by a suitable conductor 17 to actuating means 18 which is in turn connected by a suitable conductor 19 to an audio signaling device 20. A disconnecting means 22 may be provided in conductor 17 to permit the pilot to disconnect the audio signaling device 20 if he so desires.

In operation, as the aircraft reaches any one of the predetermined altitudes, an output pulse is generated by the altitude sensing means 10 at one of the outlets 11a-f which has been previously adjusted for that specific altitude. The output pulse travels along the appropriate conductor 12a-f to the corresponding actuating means 13a-f and activates the actuating means. When activated the actuating means directs a signal activating means along the conductor 14a-f to the visual signaling display 16. The signal activating means on reaching the display 16 activates the particular signaling means 15a-f which has been identified to designate that specific altitude. Simultaneously, the actuating means 13a-f causes another activating means to pass along conductor 17 to actuating means 18 which is activated thus causing a signal activating means to flow along conductor 19 to activate the audio signal device 20.

In a preferred embodiment of this invention, the altitude sensing means 10 is a radar altimeter of the general type presently installed on most modern aircraft. These altimeters are normally capable of sensing altitudes from 2,500 feet above the ground down to ground level with an error not greater than ± 5 percent. In addition, many of these altimeters are equipped with from six to ten terminals which can be adjusted individually to give an electrical output pulse whenever the aircraft passes through a preselected altitude. An example of such a radar altimeter is the Collins Radio Altimeter, Model AL-101. In such a preferred embodiment, the various conductors 12a-f, 14a-f, 17, 19 and 21a-f are suitable electric wires. The actuating means 13a-f and 18 are any standard electrical switching means such as, for example, electric relays and the signaling means 15a-f constitutes electric lights installed in the signaling display 16 in such a fashion as to provide a readily identifiable indication of the specific altitude reached. In this preferred embodiment the actuating means 13a-f are so designed that once they have been activated the appropriate light 15a-f remains on until it is manually disconnected by the corresponding switch 21a-f. The actuating means 18 however automatically resets after each pulse so that the audio signal does not sound continuously but after a brief period becomes silent and available to provide a similar alert when the next designated altitude is reached.

Figure 2:
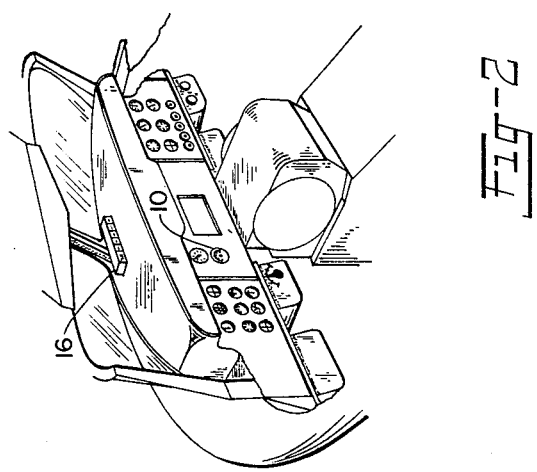
FIG. 2 is a drawing depicting an aircraft instrument panel showing a preferred location of a signal display means.

In one embodiment of the subject invention the visual signaling device is mounted near the bottom of the windscreen in the center of the aircraft, as shown in FIG. 2 and consists of a series of six lights mounted horizontally from right to left and in a descending altitude line to the left so that the light 15f represents the minimum decision height. In operation of this embodiment the light 15a furtherest to the right is normally adjusted for 1,400 feet since most airports presently have the outer marker altitude at 1,500 feet. Inadvertent premature descent below this altitude will trigger the light 15a should the aircraft descend as low as 1,400 feet. Thus if this light goes on prior to the pilot passing through the outer marker he is alerted to the fact that he is below his desired approach altitude. The second light 15b is preferably adjusted for 900 feet and will thus come on when the airplane is in the final stabilized approach. The third light 15c which is adjusted for 600 feet, comes on as the aircraft is approaching visual flight altitude minimums. This is the point the aircraft normally begins to decelerate to threshold speed when on an instrument landing approach. The fourth light 15d is adjusted for 300 feet which is just below the normal visual flight lower descent limits. If the pilot does not have visual ground reference this light indicates that he is below his minimums. On an instrument landing approach, this light will come on at the beginning of the glide slope extension phase of the flight director. It also alerts the pilot that he is 6–8 seconds from the middle marker on the approach. The fifth light 15e is adjusted for the 150 feet level. This level indicates that for a 200 feet decision height the pilot is below his minimum altitude. On a category 2 approach with a decision height of 100 feet, the approach lights should be coming into view. This light will also alert him that during the next 3 or 4 seconds he must decide whether the visibility is sufficient for him to continue his approach. The sixth and final light 15f which is the light normally closest to the pilot, is the decision height light. This light is adjustable by the pilot to reflect the minimum decision height for the particular approach. When this light comes on, the pilot must be in visual contact with the ground or he must abandon the approach. As can be seen, the function of this display is to provide the pilot with a lengthening sequence of lights as he descends lower. If desired, the lights may be of different colors to make it easier to determine which lights are on without directly looking at the indicator. As will be appreciated this apparatus can function equally well to provide similar altitude information to the pilot during aircraft departures. The foregoing description of the sequence of operation during approaches is intended to be illustrative only and to, in no way, limit the usefulness of the invention.

It is understood that the apparatus specifically described represents merely a preferred embodiment. The altitude sensing means can be any type of altitude measuring device which can be adapted to provide the necessary output pulses at a plurality of designated altitudes. The output pulse is not restricted to an electrical pulse but can be any type of pulse capable of causing the actuating device to function. The signaling display is not restricted to a plurality of electric lights but can be any type or combination of visual or audio signals capable of providing the desired warning to the pilot. In addition, it should be further understood that, where visual signals are provided, the signaling device can be mounted vertically, horizontally or in any other fashion as desired and may consist of any number of signaling means of any color or combination of colors. Any arrangement of signaling means is satisfactory so long as the pilot may view or hear and understand the signals without having to direct his attention away from the approaching runway to the signaling device. If desired the apparatus can be equipped with one or several test circuits capable of establishing the proper functioning of the individual components of the apparatus.

It is further understood that variations and modifications can be effected within the spirit and scope of the invention as described hereinabove and as defined in the appended claims.

I claim:

1. In an altitude signaling apparatus for furnishing aircraft pilots with definite signals when the aircraft has reached each of a series of preselected altitudes, the combination of:
   a. a plurality of signaling means capable of providing the pilot with the desired altitude information while the pilot is looking through the aircraft windscreen;
   c. b. actuating means for selectively actuating each of said plurality of signaling means in accordance with data defining the altitude of the aircraft;
   sensing means for producing data defining the altitude of the aircraft, and
   d. means operatively connecting the data produced by said sensing means to said actuating means whereby at least one of said signaling means is actuated whenever the aircraft reaches each of the predetermined altitudes.

2. An altitude signaling apparatus according to claim 1 wherein the signaling means comprises a visual display suitable for mounting within the peripheral vision of the pilot as he looks through the aircraft windscreen.

3. An altitude signaling apparatus according to claim 2 wherein said visual display comprises a plurality of electric lights at least one of which is actuated each time the aircraft reaches each of the preselected altitudes.

4. An altitude signaling apparatus according to claim 3 wherein means is provided for maintaining said electric lights in an energized condition until manually de-energized.

5. An altitude signaling apparatus according to claim 4 wherein the electric lights are arranged in a geometrical pattern, the progressive lighting of which corresponds with the passage of the aircraft through the preselected altitudes.

6. An altitude signaling apparatus according to claim 2 wherein audio signaling means is operatively connected to the display apparatus so as to generate an audio signal and thereby alert the pilot to the changed condition of the visual display.

7. An altitude signaling apparatus according to claim 1 wherein the signaling means comprises an audio signaling means capable of providing a different audio signal for each of the preselected altitudes.

8. An altitude signaling apparatus according to claim 1 wherein the sensing means is a radar altimeter.

* * * * *

Dedication 3,668,621.—*Carl L. Boyd*, Kingsport, Tenn. MULTIPLE ALTITUDE SIGNALING DEVICE. Patent dated June 6, 1972. Dedication filed Aug. 8, 1972, by the assignee, *Eastman Kodak Company*.

Hereby dedicates to the Public the portion of the term of said patent subsequent to July 13, 1972.

[*Official Gazette January 16, 1973.*]